United States Patent
Mizuno et al.

(10) Patent No.: US 8,055,974 B2
(45) Date of Patent: Nov. 8, 2011

(54) CONTENT DISTRIBUTION METHOD, ENCODING METHOD, RECEPTION/REPRODUCTION METHOD AND APPARATUS, AND PROGRAM

(75) Inventors: Daisuke Mizuno, Tokyo (JP); Hiroaki Dei, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/943,073

(22) Filed: Nov. 10, 2010

(65) Prior Publication Data

US 2011/0055658 A1   Mar. 3, 2011

Related U.S. Application Data

(63) Continuation of application No. 10/587,712, filed as application No. PCT/JP2004/018574 on Dec. 13, 2004, now Pat. No. 7,856,585.

(30) Foreign Application Priority Data

Jan. 28, 2004   (JP) ................................. 2004-020124

(51) Int. Cl.
*H03M 13/00* (2006.01)
(52) U.S. Cl. .......................... 714/755; 714/753; 714/762
(58) Field of Classification Search .................. 714/755, 714/753, 762, 701, 754
See application file for complete search history.

(56) References Cited

U.S. PATENT DOCUMENTS

| | | | |
|---|---|---|---|
| 5,862,153 A | 1/1999 | Kikuchi et al. | |
| 6,081,909 A | 6/2000 | Luby et al. | |
| 6,163,870 A | 12/2000 | Luby et al. | |
| 7,079,696 B2 | 7/2006 | Koide | |
| 2002/0019967 A1 | 2/2002 | Bonifas | |
| 2003/0004992 A1* | 1/2003 | Matsui et al. | 707/512 |
| 2003/0123844 A1* | 7/2003 | Toma et al. | 386/46 |

FOREIGN PATENT DOCUMENTS

| | | |
|---|---|---|
| JP | 9-294264 A | 11/1997 |
| JP | 9-307532 A | 11/1997 |

(Continued)

OTHER PUBLICATIONS

Financial Computer of Huanan, Design and Reality of a Live Video Broadcast System, Cho Haku-Hin, Kanan Kunyu Computer, 10th Edition, No. 12, pp. 43-44 (2003).

(Continued)

*Primary Examiner* — Fritz Alphonse
(74) *Attorney, Agent, or Firm* — Dickstein Shapiro LLP

(57) ABSTRACT

There are provided a content data transmission method, device, and program that minimize serious disturbances in reproduced content on the reception side, caused by a transmission error of encoded data, without sending feedback information from the reception side to the transmission side. When an encoder creates encoded data to be distributed, the encoder creates plural items of encoded data at the same time or creates FEC data at the same time in advance and, when storing the data in a file, stores the data as if the data were one item of encoded data. When a distribution server distributes the data using the file, the plurality of items of encoded data are automatically distributed at the same time and the FEC data is distributed. A client receives the plurality of items of encoded data or the FEC data to reduce the probability of data shortage due to a packet loss and, as a result, the deterioration in the image quality and the audio quality is reduced.

10 Claims, 8 Drawing Sheets

FOREIGN PATENT DOCUMENTS

| | | |
|---|---|---|
| JP | 10-126389 A | 5/1998 |
| JP | 10-136379 A | 5/1998 |
| JP | 10-191282 | 7/1998 |
| JP | 11-331253 A | 11/1999 |
| JP | 2001-101427 | 4/2001 |
| JP | 2001-136150 A | 5/2001 |
| JP | 2003-299095 A | 10/2003 |
| JP | 2003-318851 A | 11/2003 |
| WO | WO-02/052862 A2 | 7/2002 |
| WO | WO-03/092296 | 11/2003 |

OTHER PUBLICATIONS

Schulzrinne et al., "Audio-Video Transport Working Group", http://www.org/rfc/rfc1889.txt, pp. 1-53 (Jan. 1996).

International Standard, ISO/IEC 14496-12, "Information technology—Coding of audio-visual objects"—Part 12: ISO base media file format (Second edition 2005).

International Standard: ISO/IEC 15444-12—Information technology—JPEG 2000 image coding system—Part 12: ISO base media file format (Second edition 2005).

* cited by examiner

CONTENT DISTRIBUTION METHOD, ENCODING METHOD, RECEPTION/REPRODUCTION METHOD AND APPARATUS, AND PROGRAM

CROSS REFERENCE TO RELATED APPLICATIONS

This is a continuation application of Ser. No. 10/587,712, filed Jul. 28, 2006 now U.S. Pat. No. 7,856,585, issued on Dec. 21, 2010, which is a National stage application under 35 U.S.C. §371 of PCT/JP04/18574, filed Dec. 13, 2004, which claims priority to Japanese application No. 2004-020124, filed Jan. 28, 2004, each of which is hereby incorporated herein by reference.

FIELD OF THE INVENTION

The present invention relates to a technology for content distribution via a network, and more particularly to a method for performing transmission of encoded data over a transmission path so as to have the tolerance for data-loss, a method for storing data in a recording device so as to have the tolerance, an encoded data reception and decoding method, and an apparatus, system, and program therefor.

BACKGROUND OF THE INVENTION

Recently, the widespread use of the Internet makes content distribution more popular where content, including moving pictures and audios, is distributed and played back via an IP (Internet Protocol) network. In the distribution of this kind, in order to improve the transmission efficiency of for example moving pictures, highly efficient compression encoding scheme based on the inter-frame prediction is used in many cases. In those schemes, predictive parameters, acquired by predicting the encoded images from the temporally preceding and following frames, and predictive residual image data are encoded to reduce the amount information of temporally correlated moving picture data. In addition, the high compression and encoding of predictive residual image data through transform-coding and quantization enables content data to be transmitted using a small amount of transmission bandwidth.

Typical exemplary transmissions use compression and encoding schemes such as MPEG (Moving Picture Experts Group)-1, MPEG-2, and MPEG-4. In those compression encoding schemes, inter-frame prediction is performed for an input image frame for each fixed-size rectangular area, called a macro block, through motion compensation, and the obtained motion vectors and the signal data, generated by compressing the predictive residual image data through the two-dimensional discrete cosine transform and quantization, are subjected to variable-length coding.

Effective compression encoding schemes based on the inter-frame prediction, such as AAC (Advanced Audio Codec), are also available for audios to enable content distribution that uses the transmission bandwidth efficiently.

Encoded data encoded by an encoder is stored in a storage device in a file format described in Non-Patent Document 2 or Non-Patent Document 3 that will be described later. The encoded data is converted to packets by the distribution server using a method such as RTP (Real-Time Transport Protocol) described in Non-Patent Document 1, which will be described later, for distribution to a client via an IP network. The client obtains the encoded data from the received packets and decodes the data to reproduce videos and audios.

On an IP network, there is a possibility that distributed packets are lost. In particular, the possibility of packet loss is higher when the network is wireless.

And, when even a part of content data is lost, a client cannot completely decode videos and audios with the result that the videos or audios are disturbed by interferences or noises or sometimes cannot be reproduced at all. This effect is particularly obvious in encoded data based on the inter-frame prediction, and interferences or noises propagate in the time direction.

To restore lost packets, the following methods are used.
Retransmission
FEC (Forward Error Correction)
Multiple-packet transmission Retransmission is a method for requesting the distribution side to redistribute a packet, which is lost on the client side, to re-distribute the packet. Note that the retransmission cannot be used on a transmission line that has no uplink.

The FEC is a technique in which the distribution side transmits encoded data and the FEC data (error correction data) in advance and, when a packet is lost, the FEC data is calculated to restore the lost packet.

The multiple-packet transmission is a method in which a packet containing the same information is transmitted multiple times to reduce the probability of packet loss.

Another known configuration is that multiple encoders are used to generate the encoded data of audio data at different compression rates at the same time for transmission over a packet-based network such as an IP network (for example, Patent Document 1 that will be described later).

Non-Patent Document 1: IETF RFC 1889 "RTP: A Transport Protocol for Real-Time Application"
Non-Patent Document 2: ISO/IEC 14496-12:2003: "Information technology •Coding of audio-visual objects—Part 12: ISO base media file format"
Non-Patent Document 3: ISO/IEC 15444-12:2003 "Information technology—JPEG 2000 image coding system—Part 12: ISO base media file format"
Patent Document 1: Japanese Patent Publication Kokai JP-A 2003-318851 (FIG. 1)

DISCLOSURE OF THE INVENTION

Problems to be Solved by the Invention

Conventionally, when the FEC is used for content distribution, the distribution server is required to generate FEC data in real time at the time of transmission. The problem with this technique is that, when the number of clients is increased, the computation resources are used up for generating FEC data.

In addition, through there are many schemes for generating FEC data, which scheme to use is fixed because it is dependent on the distribution server. This results in the decrease of flexibility to make it difficult to change the FEC scheme according to the characteristics of the transmission line.

On the other hand, the multiple-packet transmission requires the distribution server to copy packets and, though less computation resources are used as compared with the FEC, this method requires a large amount of bandwidth of the transmission line.

Accordingly, it is a major object of the present invention to provide a content encoding scheme, a reception and reproduction method, a distribution method, a device, and a program that minimize serious disturbances in reproduced content on the reception side, caused by a transmission error of encoded data, without sending feedback information from the reception side to the transmission side.

It is another object of the present invention to provide a method, a device, and a program for achieving the major object described above without depending on a particular content distribution server.

It is still another object of the present invention to provide a method, a device, and a program for achieving the major object described above without placing an extra calculation load on a content distribution server.

Means to Solving the Problems

To solve the above problems, the invention disclosed in this application is configured generally as described below.

According to the present invention, when an encoder encodes content, the encoder creates plural items of encoded data, each of which has a different compression rate, at the same time or creates FEC (Forwards Error Correction) data of the encoded data at the same time. The created encoded data or FEC data is stored in a storage device preferably as a single file. When the data is stored in the file, an identifier is added to each item of encoded data and FEC data and the data is stored as if it was one item of coded data (continuous encoded data).

A method according to one aspect of the present invention comprises the steps of creating N items (where, N is a positive integer equal to or greater than 2) of encoded data from one received content; and consolidating the N items of encoded data into at least one file as a single item of encoded data.

The method of the present invention may comprise the steps of creating N items (where, N is a positive integer equal to or greater than 2) of encoded data from one received content;

merging the N items of encoded data on a frame basis; and storing the N merged items of encoded data into at least one file as a single track.

In the present invention, the method may comprise the steps of merging the N items of encoded data on a frame basis with the N items of encoded data shifted with each other by a predetermined length of time; and storing the N merged items of encoded data into at least one file as a single track.

In the present invention, the content may be encoded in such a way that the encoded data can be decoded even if the same part of the content is exchanged among the N items of encoded data on a per-encoding basis. In the present invention, an identifier of the same number may be added to encoding units of the same part of the N items of encoded data as a header.

A method according to another aspect of the present invention comprises the steps of creating encoded data from a received content; creating error correcting code (FEC) data from the encoded data; and consolidating the encoded data and the Forward Error Correction data into at least one file as a single item of encoded data.

The method of the present invention may comprise the steps of creating encoded data from a received content;

creating error correcting code (FEC) data from the encoded data; and merging the encoded data and the Forward Error Correction data on a frame basis with the encoded data and the Forward Error Correction data shifted with each other by a predetermined length of time and storing the encoded data and the Forward Error Correction data into at least one file as a single track.

An encoding apparatus according to one aspect of the present invention comprises means for creating N items (where, N is a positive integer equal to or greater than 2) of encoded data from one received content; and means for consolidating the N items of encoded data into at least one file as a single item of encoded data.

The encoding apparatus of the present invention may comprise means for creating N items (where, N is a positive integer equal to or greater than 2) of encoded data from one received content; means for merging the N items of encoded data on a frame basis; and means for storing the N merged items of encoded data into at least one file as one item of continuous encoded data.

The encoding apparatus of the present invention may comprise means for merging the N items of encoded data on a frame basis with the N items of encoded data shifted with each other by a predetermined length of time; and means for storing the N merged items of encoded data into at least one file as a single track.

A program according to another aspect of the present invention causes a computer, which constitutes an encoding apparatus that receives a content for encoding, to:

create N items (where, N is a positive integer equal to or greater than 2) of encoded data from one received content; and consolidate the N items of encoded data into at least one file as a single item of encoded data.

The program of the present invention may cause a computer, which constitutes an encoding apparatus that receives a content for encoding, to:

create N items (where, N is a positive integer equal to or greater than 2) of encoded data from one received content;

merge the N items of encoded data on a frame basis; and store the N merged items of encoded data into at least one file as a single track.

A content reception/reproduction method according to another aspect of the present invention comprises the steps of receiving data created by merging plural items of encoded data;

identifying each item of encoded data from the received data on a per-encoding basis;

separating the received data into items of encoded data on a per-encoding basis; and decoding the separated encoded data for output.

A client apparatus according to another aspect of the present invention comprises means for receiving data created by merging plural items of encoded data; means for identifying each of plural items of encoded data from the received data on a per-encoding basis; means for separating the received data into items of encoded data on a per-encoding basis; and means for decoding the separated encoded data for output.

A system according to another aspect of the present invention comprises an encoder that encodes content data or input data received from an image signal input device, such as a camera, and records the data to a file; a distribution server that distributes the data, recorded in the file, to a client apparatus over a network; and a client apparatus that selects the data, sent from the distribution server and received via the network, and decodes the selected data for display and reproduction. The encoder preferably comprises a data input unit that receives content data or input data of the image input device; first to Nth encoding units that encode the input data and outputs N items (N is a positive integer equal to or greater than 2) of encoded data; a merge unit that merges the N items of encoded data into one item of continuous encoded data; and a file output unit that outputs the one item of continuous encoded data and information on the continuous encoded data to the file. The client apparatus preferably comprises a reception unit that receives a packet from the distribution server via the network; a data processing unit that restores the received packet to continuous encoded data; a data reconstruction unit that reconstructs the continuous encoded data to one item of encoded data and, for a part where plural items of encoded data are present, discards data of a relatively higher compression rate to eliminate data duplication in the same frame or the same part; a decoding unit that decodes the reconstructed encoded data; and a reproduction unit that reproduces and displays the decoded data.

According to the present invention, though standard RTP (Real-time Transport Protocol) packets are distributed at data distribution time, plural items of encoded data are distributed and/or FEC data is also distributed at the same time because data is stored as described above. The reception side selects encoded data, which has the lowest compression-rate and better image/audio quality, from the received encoded data on a frame basis and decodes the selected encoded data. Alternatively, the reception side decodes and reproduces encoded data, which could not be received, using the received FEC data. As a result, the probability of losing packets is reduced and thereby the object of the present invention described above is achieved.

Meritorious Effects of the Invention

According to the present invention, serious disturbances in reproduced content on the reception side, caused by a transmission error of encoded data, can be reduced.

This is because the present invention sends plural items of encoded data or sends FEC data to reduce the probability of a data loss caused by a transmission error.

According to the present invention, means for achieving the effect described above depends only on the encoder, and the client and the distribution server can have a usual standard configuration.

This is because plural items of encoded data or FEC data is stored as one file, an intermediate distribution server is not affected.

According to the present invention, the effect described above can be achieved without adding an extra calculation load to the distribution server.

This is because packets are copied or FEC data is created at encoding time in the present invention and, at distribution time, the data is already stored in a file.

EXPLANATIONS OF SYMBOLS

Figure 1:
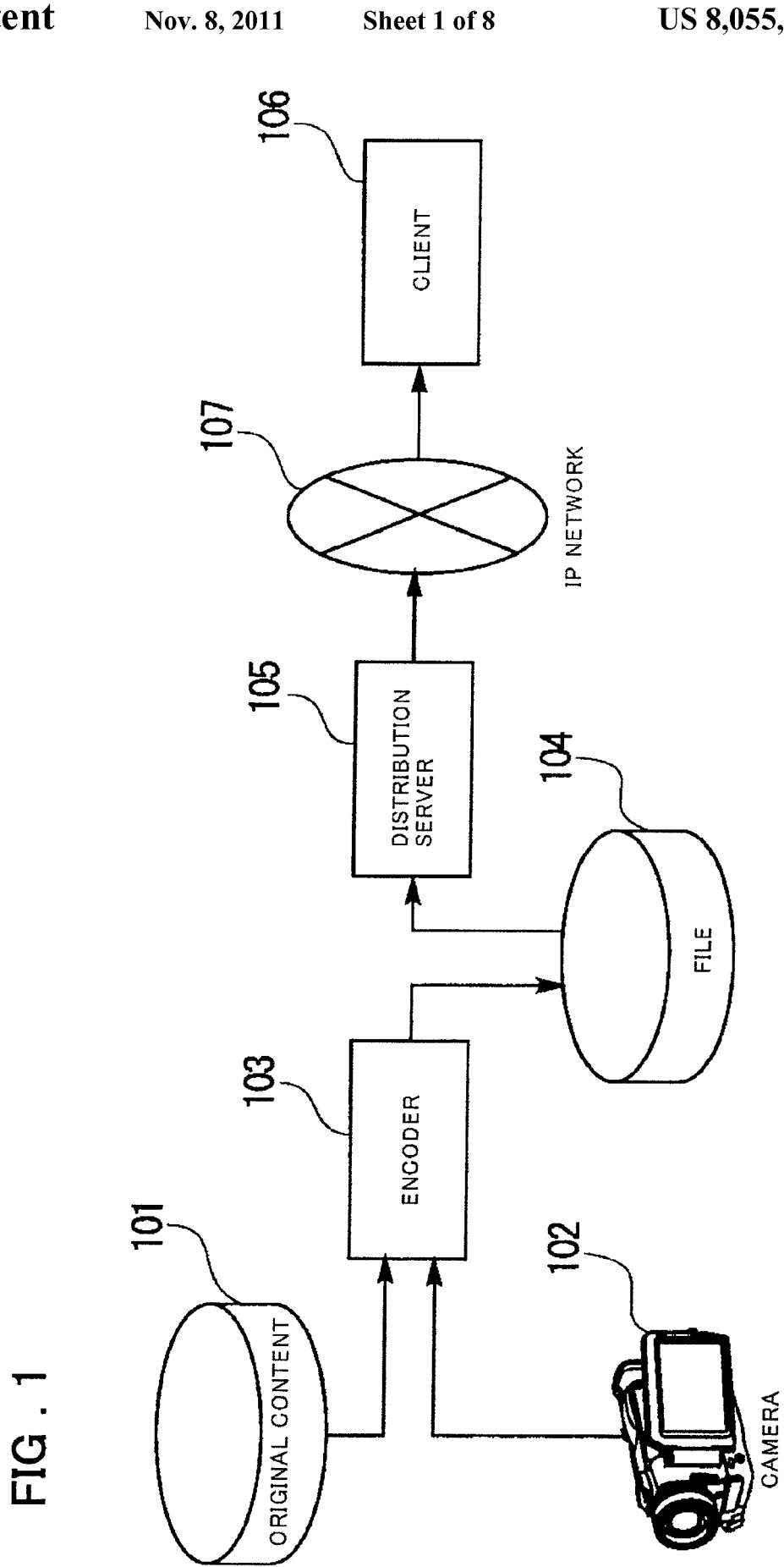
FIG. 1 is a diagram showing the configuration of one embodiment of the present invention.

101 Original content
102 Camera
103 Encoder
104 File
105 Distribution server
106 Client
107 IP network
201 Original content
202 Camera
203 Encoder
204 Data input unit
205 First encoding unit
206 Second encoding unit
207 Nth encoding unit
208 Merge unit
209 File output unit
210 File
301 File
302 Distribution server
303 File input unit
304 File analysis unit
305 Call processing unit
306 Packet generation unit
307 Distribution unit
401 Client
402 Call processing unit
403 Reception unit
404 Data processing unit
405 Data reconstruction unit
406 Decoding unit
407 Reproduction unit
501 Encoded data A
502 Encoded data B
503 Continuous encoded data
504 Header
601 Original content
602 Camera
603 Encoder
604 Data input unit
605 First encoding unit
606 Second encoding unit
607 Merge unit
608 File output unit
609 File
701 Original content
702 Camera
703 Encoder
704 Data input unit
705 Encoding unit
706 FEC unit
707 Merge unit
708 File output unit
709 File
801 Encoded data
802 Continuous encoded data
803 FEC
804 Header

BEST MODE FOR CARRYING OUT THE INVENTION

Embodiments of the present invention will be described more in detail below with reference to the attached drawings.

FIG. 1 is a diagram showing the configuration of a first embodiment of the present invention. Referring to FIG. 1, the first embodiment of the present invention comprises an encoder 103, a distribution server 105, and a client 106 (terminal). The following describes the general operation of those components.

The encoder 103 encodes the data of original content 101 or input data (digital signal data) from a camera (CCD camera, etc.) 102 and records the encoded data in a file 104. The input data is moving picture data, or moving picture data and audio data.

The distribution server 105 distributes data, recorded in the file 104, to the client 106 via an IP (Internet Protocol) network 107.

The client 106 selects data from the data received from the distribution server 105 via the IP network 107, decodes the data, and displays and reproduces the decoded data on an output device.

Figure 2:
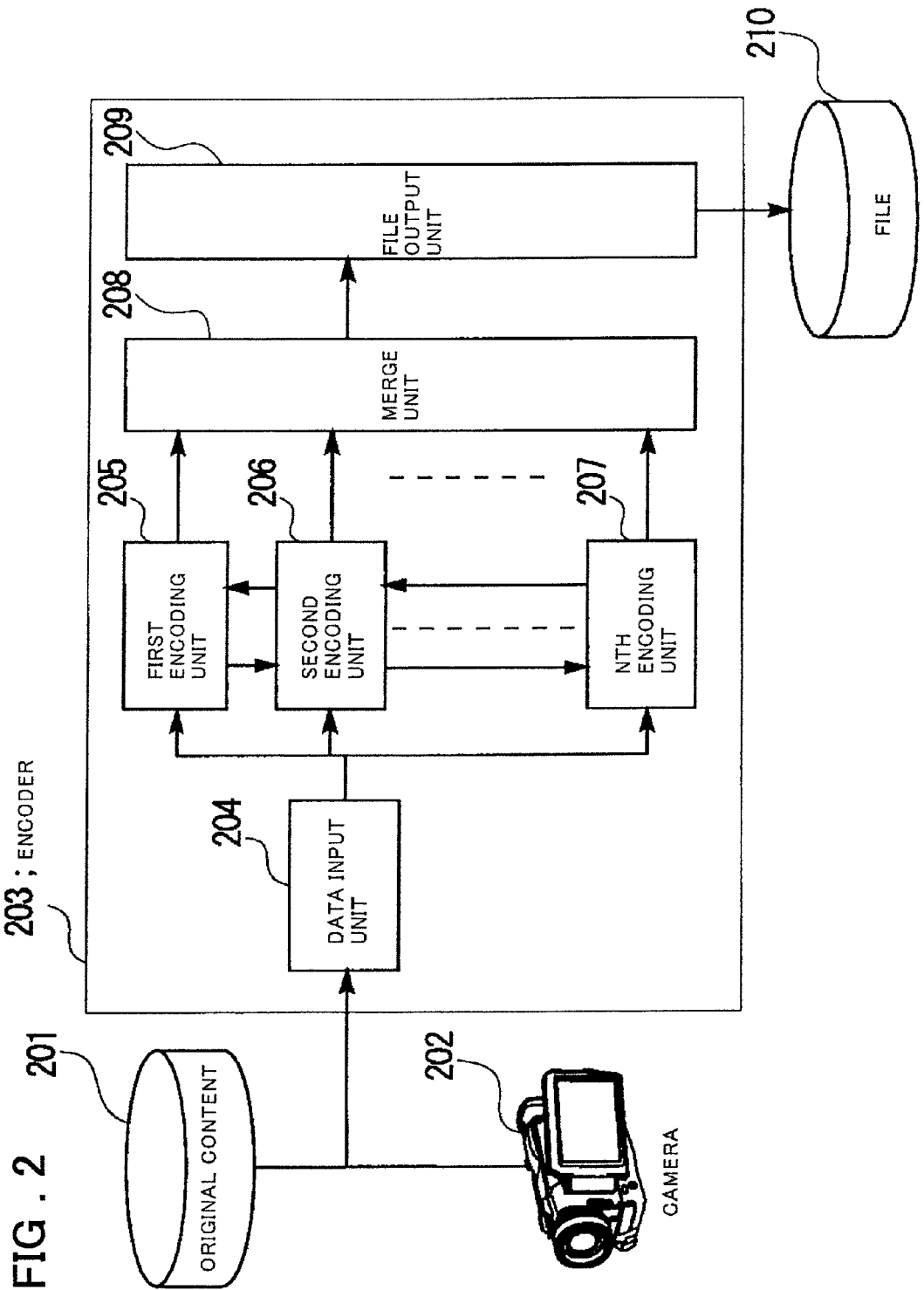
FIG. 2 is a diagram showing the configuration of an encoder in one embodiment of the present invention.

FIG. 2 is a diagram showing an example of the configuration of the encoder 103 in FIG. 1 (indicated by the numeral 203 in FIG. 2). Referring to FIG. 2, the encoder 203 comprises a data input unit 204, a first encoding unit 205 to an Nth encoding unit 207 (N is a predetermined positive integer equal to or greater than 2), a merge unit 208, and a file output unit 209.

With reference to FIG. 2, the following describes the operation of the encoder 203. First, the data input unit 204 receives moving picture data and/or audio data from original content 201 or a camera 202.

Next, the first encoding unit 205 to the Nth encoding unit 207 encode moving picture and audio data and output N items of encoded data. In this case, the parameters used by N encoding units, 205-207, may be set individually and compression rates may be set individually. N items of encoded data are encoded so that they can be decoded even when data is exchanged among plural items on a per-encoding basis. The encoding unit is a frame or, for MPEG-4 encoding, a video packet is or a macro block.

Next, the N items of encoded data are reconstituted by the merge unit 208 into one item of continuous encoded data.

Next, the constituted continuous data is output by the file output unit 209 into at least one file. At this time, not only the continuous encoded data but also information on the continuous encoded data itself is output.

Figure 3:
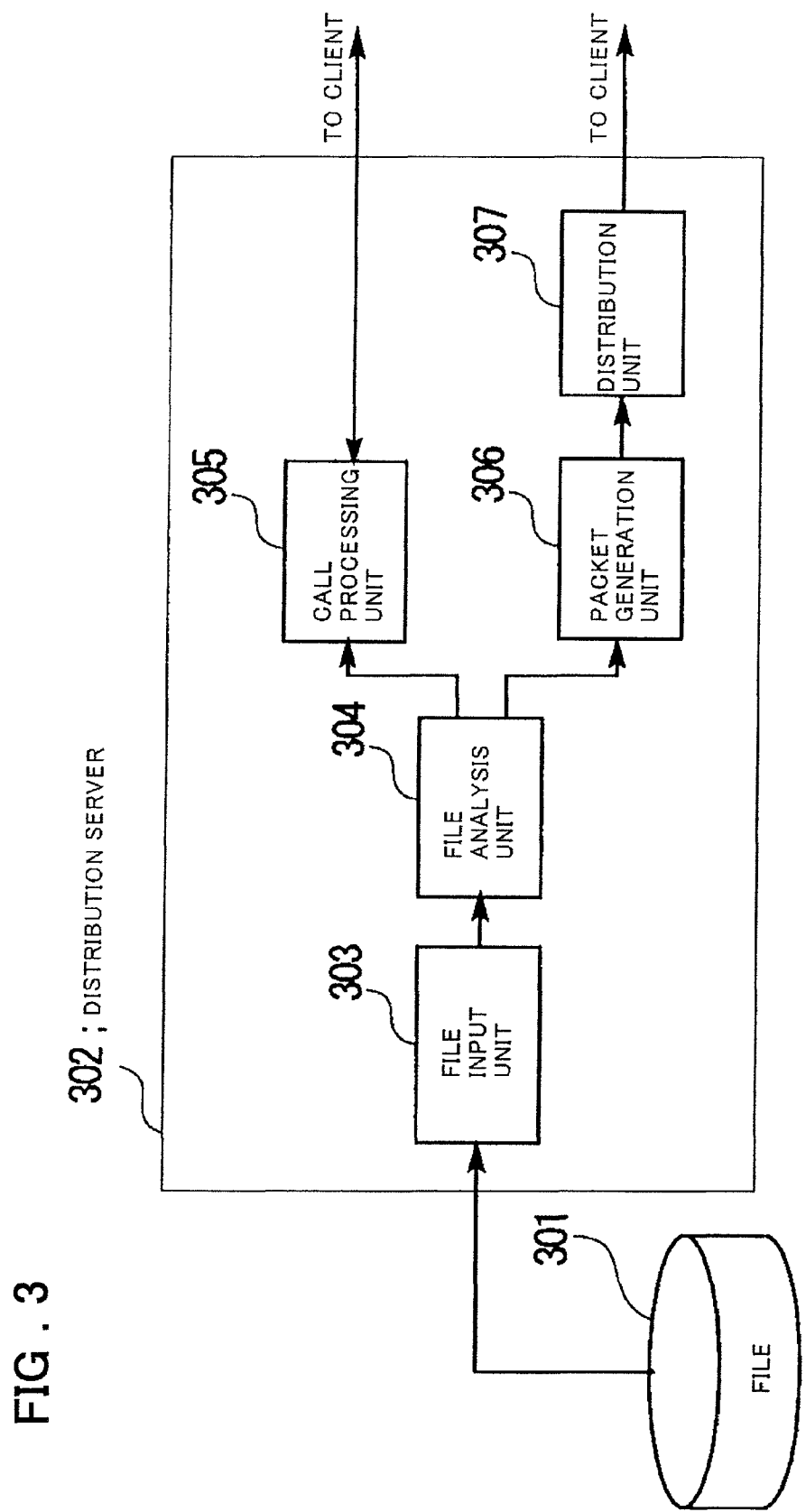
FIG. 3 is a diagram showing the configuration of a distribution server in one embodiment of the present invention.

FIG. 3 is a diagram showing an example of the configuration of the distribution server 105 in FIG. 1 (indicated by the reference numeral 302 in FIG. 3). Referring to FIG. 3, the distribution server 302 comprises a file input unit 303, a file analysis unit 304, a call processing unit 305, a packet generation unit 306, and a distribution unit 307.

Referring to FIG. 3, the following describes the operation of the distribution server 302. The file input unit 303 reads data from a file 301 (corresponds to the file 104 in FIG. 1). The data is analyzed by the file analysis unit 304 and divided into transmission units.

The data divided into transmission units by the file analysis unit 304 is encapsulated into a packet for transmission by the packet generation unit 306.

The packets created by the packet generation unit 306 are distributed by the distribution unit 307 to the client 106 via the IP network 107.

The call processing unit 305 performs information transfer, information exchange with the client 106 based on the information obtained by the file analysis unit 304.

Because N items of encoded data are configured in a bunch in the file 301, the distribution unit 307 distributes entire packets of the N items of encoded data.

Figure 4:
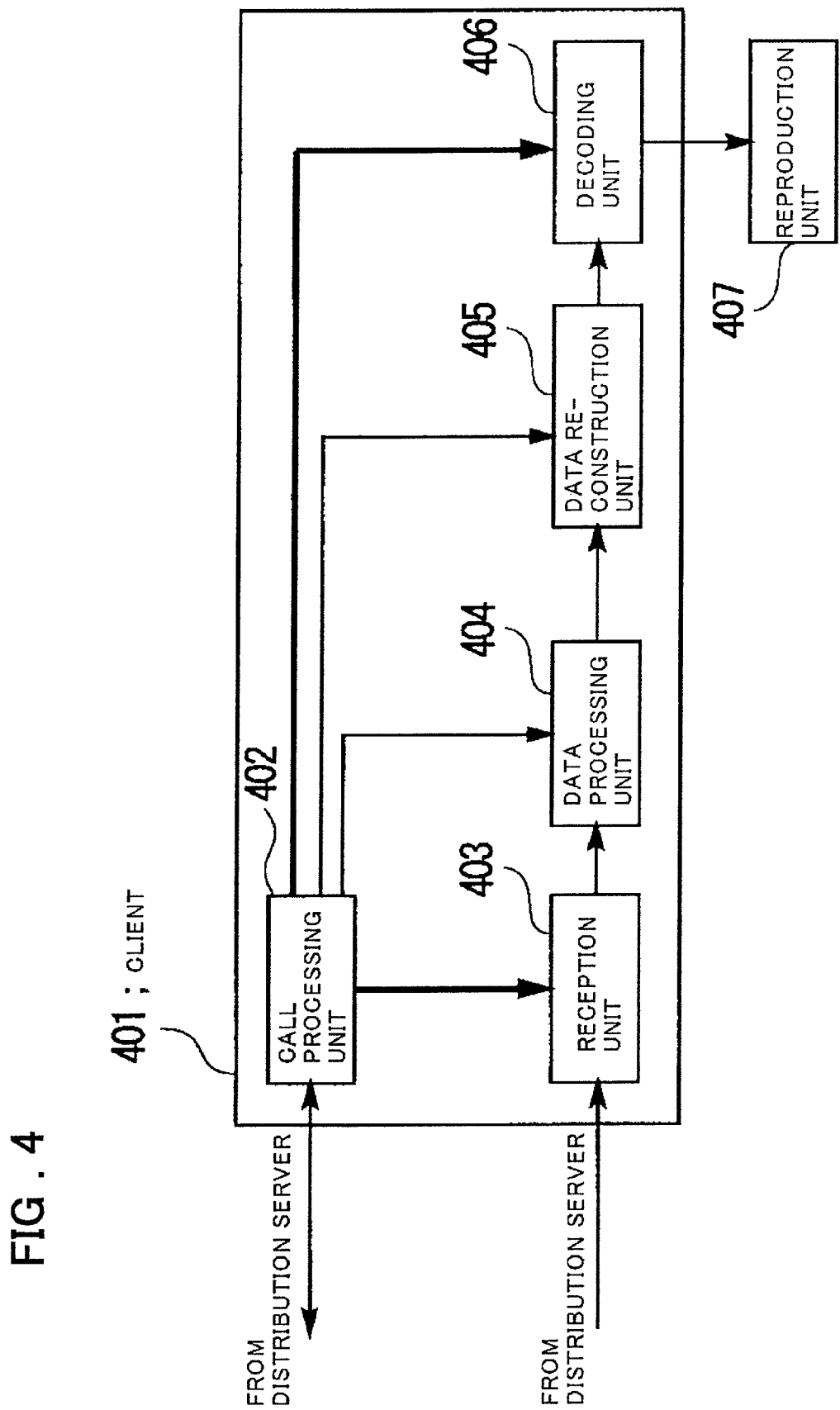
FIG. 4 is a diagram showing the configuration of a client in one embodiment of the present invention.

FIG. 4 is a diagram showing an example of the configuration of the client 106 in FIG. 1 (indicated by the numeral 401 in FIG. 4). Referring to FIG. 4, the client 401 comprises a call processing unit 402, a reception unit 403, a data processing unit 404, a data reconstruction unit 405, a decoding unit 406, and a reproduction unit 407.

With reference to FIG. 4, the following describes the operation of the client 401. The call processing unit 402 communicates or exchanges information with the distribution server 105 to obtain information on data to be distributed.

The reception unit 403 receives packets from the distribution server 105 via the IP network 107.

The packets received by the reception unit 403 are changed by the data processing unit 404 back into continuous encoded data using the information from the call processing unit 402. Note that the data of the packets lost during the transmission over the IP network 107 is not present.

Next, the data reconstruction unit 405 reconstructs the continuous encoded data into one item of original encoded data. To eliminate the data duplication of the same encoding unit, the data of higher compression rate is discarded from a part where there are two or more items of encoded data.

Next, the decoding unit 406 uses the information from the call processing unit 402 to decode the data, reconstructed by the data reconstruction unit 405, into the original moving picture or audio data, which is then reproduced or displayed by the reproduction unit 407.

The following describes the operation effect of the first embodiment of the present invention.

Referring to FIG. 1, multiple items of encoded data are configured in the file 104 as if they were one item of encoded data. Therefore, when the distribution server 105 distributes the data in the standard method, multiple items of encoded data are distributed as packets automatically at the same time. Although the image quality and the audio quality are deteriorated if packets are lost during the distribution, the probability of packet loss is reduced because multiple items of encoded data are distributed at the same time.

As a result, the client 106 can avoid the deterioration of the image quality and the audio quality as compared when the client does not use the method of the present invention. In the present embodiment, the compression rate of encoded data is varied and, therefore, the transmission bandwidth used can be reduced as compared when the same data is simply transmitted multiple times.

Next, a second embodiment of the present invention will be described in detail. The second embodiment of the present invention differs from the first embodiment of the present invention in the configuration of the encoder 103. That is, the configuration of the encoder 103 in the first embodiment of the present invention shown in FIG. 1 is changed from the configuration of the encoder 203 in FIG. 2 to the configuration of an encoder 703 in FIG. 7.

Figure 7:
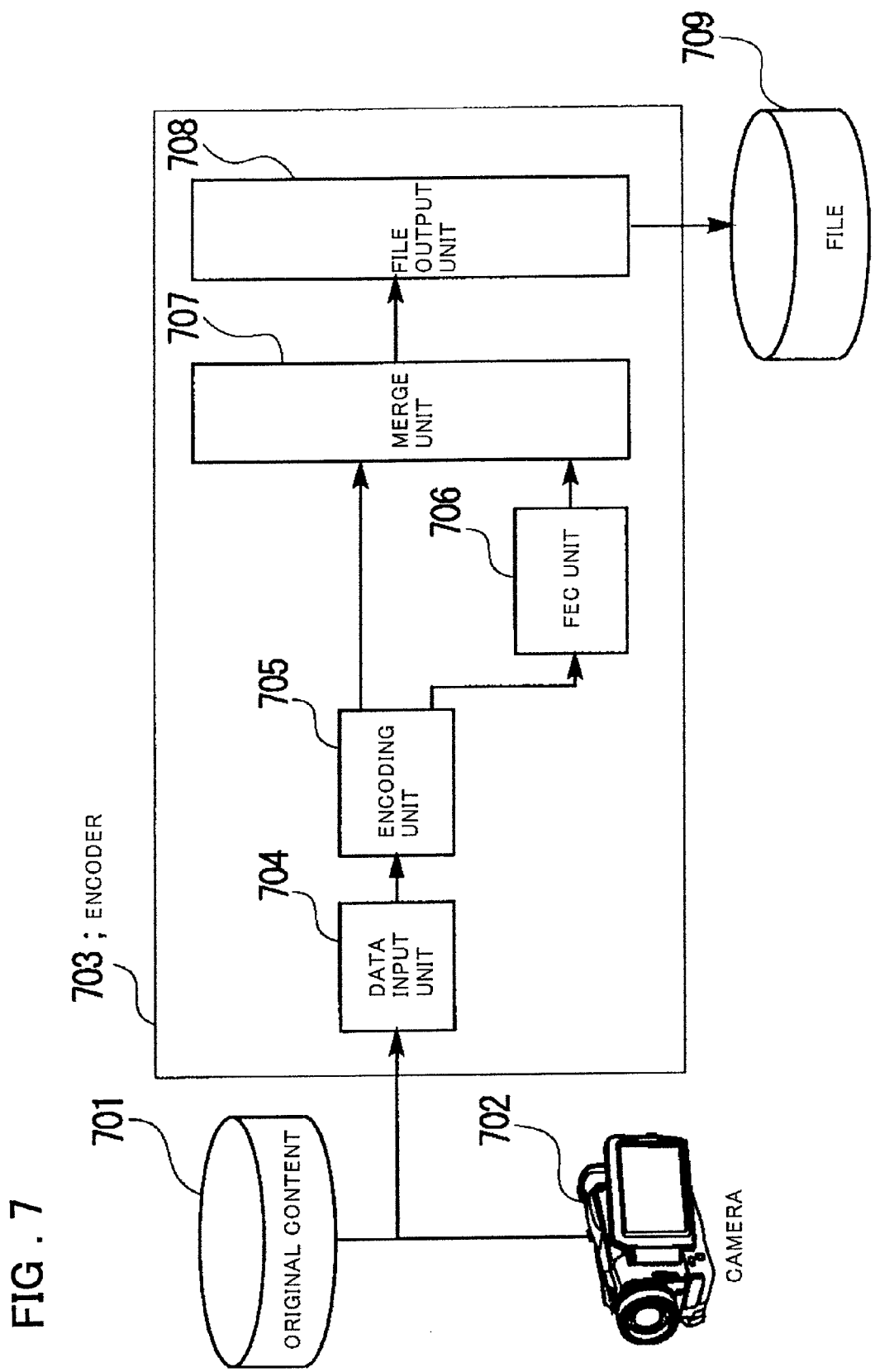
FIG. 7 is a diagram showing the configuration of an encoder in another embodiment of the present invention.

Referring to FIG. 7, the encoder 703 comprises a data input unit 704, an encoding unit 705, an FEC unit 706, a merge unit 707, and a file output unit 708. Original content 701, a camera 702, and a file 709 correspond to the original content 101, the camera 102, and the file 104 in FIG. 1.

Next, the following describes the operation of the encoder 703. First, moving picture data and/or audio data are input from the original content 701 or the camera 702 to the data input unit 704.

Next, the moving picture data and audio data are encoded by the encoding unit 705. At the same time, FEC data is generated by the FEC unit 706 using the encoded data.

Next, the encoded data and the FEC data are reconstituted by the merge unit 707 into one item of continuous encoded data.

Next, the constituted continuous data is output by the file output unit 708 into at least one file 709. At this time, not only the continuous encoded data but also information on the continuous encoded data itself is output.

In the present embodiment, the distribution server 105 in FIG. 1 has the configuration shown in FIG. 3 and operates as follows. Referring to FIG. 3, the distribution server 302 reads data from the file 301 via the file input unit 303. The data is analyzed by the file analysis unit 304 and is divided into transmission units. The divided data is encapsulated by the packet generation unit 306 into transmission packets. The created packets are distributed to the client 106 (see FIG. 1) by the distribution unit 307 via the IP network 107 (see FIG. 1). The call processing unit 305 communicates or exchanges information with the client based on the information obtained by the file analysis unit 304. Because the encoded data and the FEC data are configured in a bunch in the file 301, the distribution unit 307 distributes the packets of the encoded data and the FEC data at the same time.

In the present embodiment, the client 106 in FIG. 1 has the configuration shown in FIG. 4 and operates as follows. The call processing unit 402 performs information transfer, information exchange with the distribution server 105 (see FIG. 1) and obtains information on data to be distributed. The reception unit 403 receives packets from the distribution server via the IP network 107 (see FIG. 1). The received packets are changed by the data processing unit 404 back into continuous encoded data using the information from the call processing unit 402. Note that the data of the packets lost during the transmission over the IP network is not present. Next, the data reconstruction unit 405 performs calculation using the FEC data to reconstruct the encoded data of the lost packets. Next, the encoded data is decoded by the decoding unit 406 into the original moving picture or audio data, which is reproduced or displayed by the reproduction unit 407.

The following describes the operation effect of the second embodiment of the present invention.

Referring to FIG. 1, the encoded data and the FEC data are configured in the file 104 as if they were one item of encoded data. Therefore, when the distribution server 105 distributes the data in the standard method, the encoded data to which the FEC data is attached is distributed automatically in packets. Although the image quality and the audio quality are degraded if packets are lost during the distribution, the encoded data can be reconfigured by distributing the FEC data even if packets are lost. As a result, the client 106 can avoid the deterioration of the image quality and the audio quality as compared when the client does not use the method of the present invention.

First Embodiment

Figure 6:
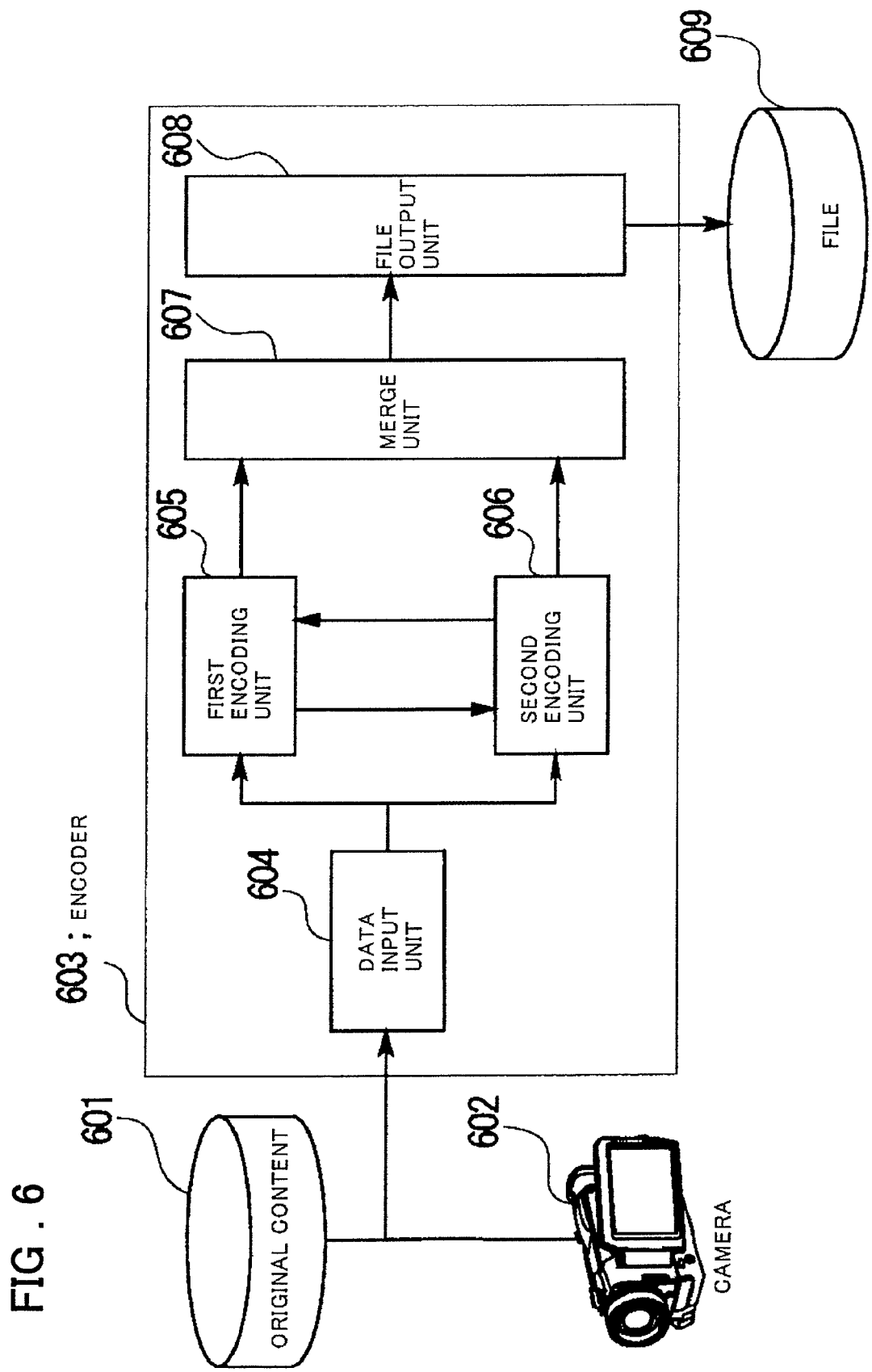
FIG. 6 is a diagram showing the configuration of an encoder in one embodiment of the present invention.

Next, the first embodiment, described above with reference to FIG. 1 to FIG. 4, will be described below using a specific embodiment. FIG. 6 is a diagram showing the configuration of one embodiment of the encoder 103 in FIG. 1 in which the encoder 203 in FIG. 2 is configured by two encoders. The basic configuration of the present embodiment is similar to that in FIG. 1 except that the encoder 103 has the configuration shown in FIG. 6 instead of the configuration of the encoder 203 in FIG. 2. The distribution server 105 and the client 106 have the same configuration as that of the corresponding unit in FIG. 3 and FIG. 4.

Referring to FIG. 6, an encoder 603 comprises a data input unit 604, a first encoding unit 605, a second encoding unit 606, a merge unit 607, and a file output unit 608.

The encoder 603 operates as follows.

First, moving picture data and/or audio data are input from original content 601 or a camera 602 to the data input unit 604.

Next, the first encoding unit 605 and the second encoding unit 606 encode moving pictures using an encoding scheme such as MPEG-4, and audios using an encoding scheme such as AAC (Advanced Audio Codec) or AMR (Adaptive Multi Rate), and output them as encoded data. At this time, the parameters used for the two encoding units 605 and 606, can be set to any values, and the compression rate may be set to any rate. Note that, for moving picture, the encoding scheme, the frame configuration, the frame rate, the intra-frame interval, and the image size must be equal between the two items of encoded data; for audios, the encoding scheme, the frame configuration, and the sampling rate must be equal between the two items of encoded data. The two items of encoded data are encoded so that they can be decoded even if the data is exchanged in the same encoding unit. Here, the encoding unit is a frame, a video packet, or a macro block.

Next, the merge unit 607 configures the two items of encoded data into one item of continuous encoded data. The following describes an example of the configuration of continuous encoded data, which is configured as described above, with reference to FIG. 5.

Encoded data A 501 is data encoded by the first encoding unit 605, while encoded data B 502 is data encoded by the second encoding unit 606. Each of encoded data is arranged in time sequence on a frame basis. These two items of encoded data configure continuous encoded data 503.

The continuous encoded data 503 is composed of the encoded data A 501 and the encoded data B 502 that are arranged alternately on a frame basis. At this time, the encoded data A 501 and the encoded data B 502 are shifted by M frames with each other so that the data of the same frame are not arranged adjacently, where M is an integer.

A header 504 is inserted at the start of each frame.

For the encoded data of a video, the header is also inserted at the start of each video packet.

This header includes an identifier indicating which encoded data, A 501 or B 502, follows this frame or video packet, the length of the frame or video packet, and the sequence number.

Next, the constituted continuous encoded data is output by the file output unit 608 into a file, such as MP4, as one track. At this time, not only the continuous encoded data but also information on the continuous encoded data and the RTP header information are output. The RTP header is output for each frame or video packet, and is transmitted by the distribution server 105 (see FIG. 1) for each frame or video packet. This information includes the size of each frame or each video packet including the header of the continuous data. Although the information is output to one MP4 file in this example, it is of course possible to output the information into multiple divided files.

In the present embodiment, the distribution server 105 in FIG. 1 has the configuration shown in FIG. 3 and operates as follows. The file input unit 303 reads data from the file 301. The data is analyzed by the file analysis unit 304 and divided into frames or video packets.

The divided data is encapsulated by the packet generation unit 306 into a RTP packet.

The RTP packets are distributed by the distribution unit 307 to the client 106 in FIG. 1 via the IP network 107 using UDP (User Datagram Protocol).

The call processing unit 305 communicates information with the client 106, based on the information obtained by the file analysis unit 304, using RTSP (Real Time Streaming Protocol) and SDP (Session Description Protocol).

Figure 5:
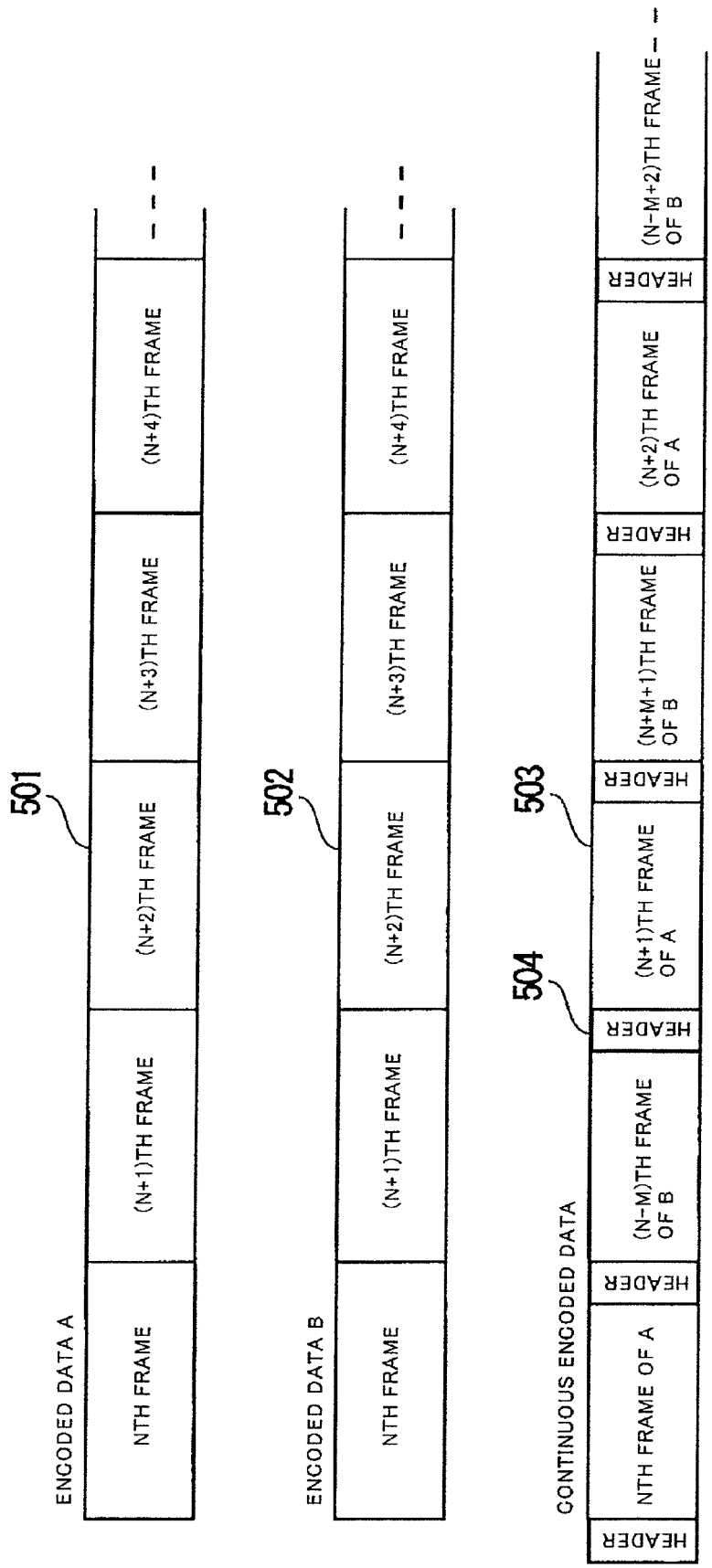
FIG. 5 is a diagram showing the configuration of the data of a file in one embodiment of the present invention.

Because the data in the file 301 is configured like the continuous encoded data 503 shown in FIG. 5, the RTP packets distributed by the distribution unit 307 are the packets of the encoded data A 501 and the packets of the encoded data B 502.

Because the continuous encoded data 503 is configured by the encoded data A 501 and the encoded data B 502 that are shifted by M frames with each other, they are also shifted in time by M frames with each other when distributed.

The client 106 has the configuration shown in FIG. 4 and operates as follows.

The call processing unit 402 communicates information with the distribution server 105 using RTSP or SDP to obtain information on the data to be distributed.

The reception unit 403 receives RTP packets from the distribution server 105.

The data processing unit 404 removes the RTP header from the received RTP packets to restore them to the original continuous encoded data 503 (see FIG. 5). Note that the data of the packets lost during the transmission over the IP network 107 is not present.

Next, to delete a duplicate part, the data reconstruction unit 405 checks the header 504 (see FIG. 5) and discards the data of high-compression rate from a part where duplicate frames or duplicate video packets are included.

Next, the header 504 (see FIG. 5) is deleted to reconstruct the data into the original one item of encoded data. Next, the decoding unit 406 decodes the data into the original moving picture or audio data, which is reproduced or displayed by the reproduction unit 407.

Second Embodiment

Next, the second embodiment described above will be described using a specific embodiment. As shown in FIG. 1, the second embodiment of the present invention comprises the encoder 103, the distribution server 105, and the client 106. As described above, the encoder 103 comprises the data input unit 704, the encoding unit 705, the FEC unit 706, the merge unit 707, and the file output unit 708 as shown in FIG. 7. The distribution server 105 comprises the file input unit 303, the file analysis unit 304, the call processing unit 305, the packet generation unit 306, and the distribution unit 307 as shown in FIG. 3. The client 106 comprises the call processing unit 402, the reception unit 403, the data processing unit 404, the data reconstruction unit 405, the decoding unit 406, and the reproduction unit 407 as shown in FIG. 4.

The encoder 703 in FIG. 7 operates as follows. First, the data input unit 704 receives moving picture and/or audio data from the original content 701 or the camera 702.

Next, the encoding unit 705 encodes moving pictures using an encoding scheme such as MPEG-4, encodes audios using an encoding scheme such as AAC or AMR, and outputs encoded data. Next, the FEC unit 706 creates FEC data using the encoded data. Although many types of FEC are known, the present invention is not concerned with the type of FEC.

Figure 8:
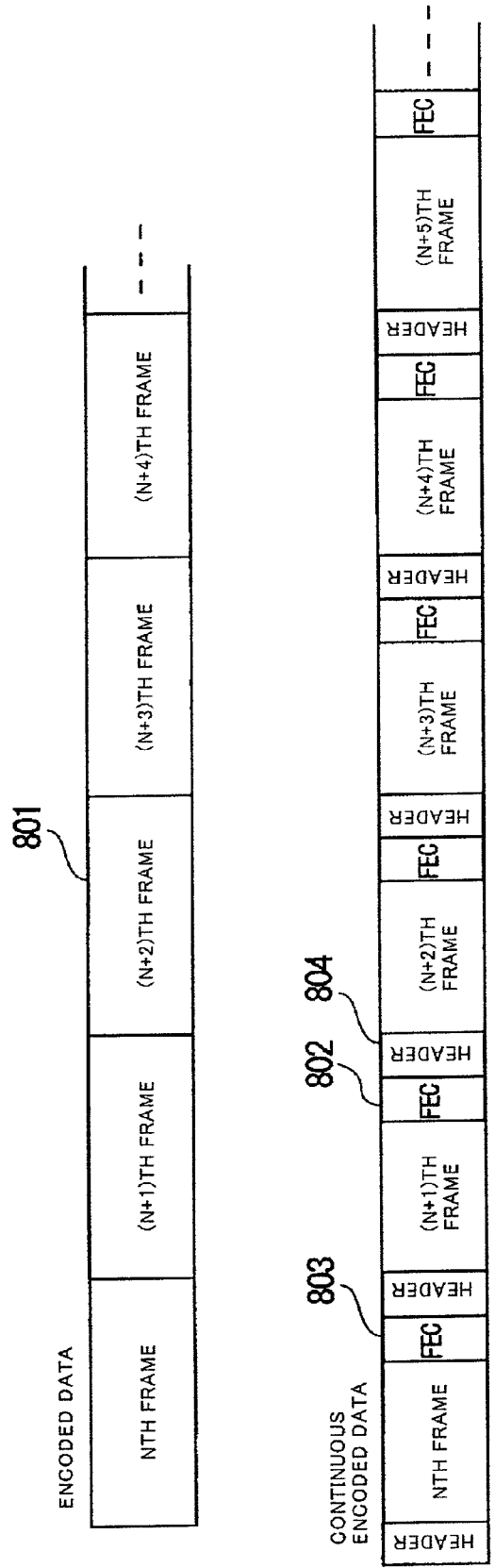
FIG. 8 is a diagram showing the configuration of the data of a file in another embodiment of the present invention.

Next, the encoded data and the FEC data are configured by the merge unit 707 into one item of continuous encoded data. The following describes an example of the configuration of this continuous encoded data with reference to FIG. 8.

Encoded data 801 is data encoded by the encoding unit 705. The encoded data is composed of data arranged in time sequence on a frame basis. This encoded data is configured into continuous encoded data 802. The continuous encoded data 802 is composed of the encoded data 801 and FEC data 803 that are arranged alternately on a frame basis or, for moving picture data, on a video packet basis. A header 804 stores information on the following frame or video packet. This information contains the length of the following frame or video packet and the sequence number.

Next, the constituted continuous encoded data is output by the file output unit 708 into at least one file (such as MP4), for example, as one track.

The information that is output at this time is not only the continuous data but also information on the continuous data itself and the RTP header information. This information includes the size of each frame or each video packet including the header in the continuous data. Although the information is output to one MP4 file in this example, it is of course possible to output the information into multiple divided files.

In the present embodiment, the distribution server 105 in FIG. 1 has the configuration shown in FIG. 3 and operates as follows. The file input unit 303 reads data from the file 301. The data is analyzed by the file analysis unit 304 and divided into frames or video packets. The divided data is encapsulated by the packet generation unit 306 into a RTP packet. The RTP packets are distributed by the distribution unit 307 to the client 106 in FIG. 1 via the IP network 107 using UDP. The call processing unit 305 communicates information with the client, based on the information obtained by the file analysis unit 304, using RTSP and SDP. Because the file 301 is composed of data indicated by the continuous encoded data 802, the RTP packets distributed by the distribution unit 307 are the packets of the encoded data and the packets of the FEC data.

The client 106 has the configuration shown in FIG. 4 and operates as follows. The call processing unit 402 communicates information with the distribution server 105 using RTSP or SDP to obtain information on the data to be distributed. The reception unit 403 receives RTP packets from the distribution server 105. The data processing unit 404 removes the RTP header from the received RTP packets to restore them to the original continuous encoded data 802. Note that the data of the packets lost during the transmission over the IP network 107 is not present. Next, the data reconstruction unit 405 performs calculation using the FEC data to reconstruct the original encoded data. Next, the decoding unit 406 decodes the data into the original moving picture or audio data, which is reproduced or displayed by the reproduction unit 407.

While the present invention has been described with reference to the embodiments above, it is to be understood that the present invention is not limited to the configuration of the embodiments above and that modifications and changes that may be made by those skilled in the art within the scope of the present invention are included.

INDUSTRIAL APPLICABILITY

The present invention is applicable to a program and a device that distribute, or receive the distribution of, videos and audios over an IP network. The present invention is also applicable to a program and a device that encode videos and audios.

What is claimed is:

1. A content reception/reproduction method performed by a client apparatus, comprising the steps of:
   receiving data created by merging encoded data and Forward Error Correction data;
   identifying encoded data and Forward Error Correction data from the received data;
   separating the received data into the encoded data and the Forward Error Correction data;
   calculating, by the client apparatus, the encoded data and the Forward Error Correction data to reconstruct encoded data; and
   decoding the separated and reconstructed encoded data for output.

2. The content reception/reproduction method as defined in claim 1, further comprising the step of receiving information, by said client apparatus, at call processing time indicating that the Forward Error Correction data will be sent.

3. The content reception/reproduction method as defined in claim 1, further comprising
   reserving a buffer size determined by at least one of
   (A) a predetermined reception buffer size,
   (B) a buffer size notified by call processing, and
   (C) a buffer size calculated based on a content distribution rate and time difference setting information so that the encoded data and the Forward Error Correction data on a per-encoding basis, which are sent with a time difference set, can be reconstructed into one item of encoded data.

4. The content reception/reproduction method as defined in claim 1, wherein the Forward Error Correction data is FEC (Forward Error Correction) data.

5. The content reception/reproduction method as defined in claim 1, further comprising the step, by said client apparatus, of receiving data from a content distribution server for reproduction according to the content reception/reproduction method.

6. A client apparatus of content, comprising:
   means for receiving data created by merging encoded data and Forward Error Correction data;
   means for identifying the encoded data and the Forward Error Correction data from the received data;
   means for separating the received data into the encoded data and the Forward Error Correction data;
   means for calculating the encoded data and the Forward Error Correction data to reconstruct the encoded data; and
   means for decoding the separated and reconstructed encoded data for output.

7. The client apparatus as defined in claim 6, further comprising means for accepting information at call processing time indicating that the Forward Error Correction data will be sent.

8. The client apparatus as defined in claim 6, further comprising:
   means for reserving a buffer size determined by at least one of
   (A) a predetermined reception buffer size,
   (B) a buffer size notified by call processing, and
   (C) a buffer size calculated based on a content distribution rate and time difference setting information
   so that the encoded data and the Forward Error Correction data on a per-encoding basis, which are sent with a time difference set, can be reconstructed into one item of encoded data.

9. The client apparatus as defined in claim 6, wherein the Forward Error Correction data is FEC (Forward Error Correction) data.

10. The client apparatus as defined in claim 6, further comprising means for receiving data from a content distribution server for reproduction.

* * * * *